(12) United States Patent
Chisholm (10) Patent No.: US 11,878,847 B2
(45) Date of Patent: Jan. 23, 2024

(54) PRESSURE RETENTION CLOSURE

(71) Applicant: Owens-Brockway Glass Container Inc., Perrysburg, OH (US)

(72) Inventor: Brian J. Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 240 days.

(21) Appl. No.: 17/534,942

(22) Filed: Nov. 24, 2021

(65) Prior Publication Data

US 2023/0159238 A1  May 25, 2023

(51) Int. Cl.
- *B65D 51/16* (2006.01)
- *B65D 41/16* (2006.01)
- *F16K 15/14* (2006.01)

(52) U.S. Cl.
CPC ....... *B65D 51/1644* (2013.01); *B65D 41/165* (2013.01); *F16K 15/148* (2013.01)

(58) Field of Classification Search
CPC .. B65D 51/1644; B65D 41/165; F16K 15/148
USPC .................. 222/562; 215/307, 310, 311, 313
See application file for complete search history.

(56) References Cited

U.S. PATENT DOCUMENTS

| | | | |
|---|---|---|---|
| 914,252 A * | 3/1909 | Eschner | B65D 41/28 215/277 |
| 954,897 A * | 4/1910 | Steininger et al. | B65D 41/0435 215/342 |
| 958,513 A * | 5/1910 | Love | B65D 41/0435 215/342 |
| 1,228,775 A * | 6/1917 | Hill | B65D 47/265 215/313 |
| 1,761,597 A * | 6/1930 | Taylor | B65D 47/265 215/307 |
| 1,857,015 A * | 5/1932 | Gere | B65D 51/1644 426/8 |

(Continued)

FOREIGN PATENT DOCUMENTS

| CN | 101289060 A | 10/2008 |
|---|---|---|
| DE | 202011003207 U1 | 5/2011 |

(Continued)

OTHER PUBLICATIONS

PCT Search Report and Written Opinion, Int. Serial No. PCT/US2022/050985, Int. Filing Date: Nov. 24, 2022, Applicant: Owens-Brockway Glass Container Inc., dated Apr. 18, 2023.

*Primary Examiner* — Paul R Durand
*Assistant Examiner* — Michael J. Melaragno (57) ABSTRACT

A container closure. The closure comprises a pressure closure assembly and an outer release shell configured to be coupled thereto. The assembly comprises a relief valve and an inner shell having a base wall, a pressure relief slot, and an outer skirt extending away from the base wall and including first and second portions. The release shell includes a first portion having a base wall configured to overlap a portion of the inner shell base wall, and a tab corresponding to the slot of the inner shell. The first portion further includes an outer skirt extending away from the first portion base wall and configured to wrap around the first portion of the outer skirt. The release shell further includes a second portion having a base wall configured to overlap a portion of the inner shell base wall, and an outer skirt extending away from the second portion base wall.

20 Claims, 8 Drawing Sheets

(56) References Cited

U.S. PATENT DOCUMENTS

| | | | | |
|---|---|---|---|---|
| 1,869,938 A * | 8/1932 | Ingram | ............ | B65D 51/1644 |
| | | | | 215/277 |
| 2,019,014 A * | 10/1935 | Kuhne | .................. | B65D 41/42 |
| | | | | 215/257 |
| 2,582,489 A * | 1/1952 | Krueger | ............ | B65D 51/1683 |
| | | | | 215/322 |
| 2,790,570 A * | 4/1957 | Hodges | ............. | B65D 51/1644 |
| | | | | 429/54 |
| 3,045,854 A * | 7/1962 | Franklin | ............ | B65D 51/1622 |
| | | | | 215/260 |
| 3,101,877 A | 8/1963 | Driscoll | | |
| 3,239,091 A * | 3/1966 | Driscoll | ............ | B65D 41/045 |
| | | | | 215/260 |
| 3,684,119 A * | 8/1972 | Burroughs | ........ | B65D 51/1683 |
| | | | | 215/251 |
| 3,685,679 A * | 8/1972 | Heffran | ................. | B65D 51/20 |
| | | | | 220/270 |
| 3,717,276 A * | 2/1973 | Luczak | ............ | B65D 51/1611 |
| | | | | 215/307 |
| 5,242,069 A * | 9/1993 | Hertrampf | ......... | B65D 51/1661 |
| | | | | 215/270 |
| 6,010,029 A | 1/2000 | Wang | | |
| 6,158,604 A * | 12/2000 | Larguia, Sr. | ......... | B65D 50/041 |
| | | | | 215/217 |
| 7,028,858 B2 * | 4/2006 | Auer | ...................... | B65D 41/17 |
| | | | | 215/354 |
| 7,074,443 B2 * | 7/2006 | Thomas | ............. | B65D 51/1644 |
| | | | | 426/118 |
| 8,360,256 B2 * | 1/2013 | O'Brien | ............... | B65D 45/325 |
| | | | | 215/310 |
| 9,663,275 B2 | 5/2017 | Chisholm | | |
| 9,919,849 B2 | 3/2018 | Forsyth et al. | | |
| 10,633,164 B2 | 4/2020 | Brozell | | |
| 2012/0018430 A1 | 1/2012 | Bork | | |
| 2020/0024041 A1 | 1/2020 | Niver | | |
| 2020/0180830 A1 * | 6/2020 | Niver | ................. | B65D 51/1672 |

FOREIGN PATENT DOCUMENTS

| | | | | |
|---|---|---|---|---|
| DE | 102012016902 B3 | 1/2014 | | |
| WO | WO-2012007707 A2 * | 1/2012 | ............ | B65D 41/04 |

* cited by examiner

PRESSURE RETENTION CLOSURE

TECHNICAL FIELD

This patent application discloses innovations to closures for containers and, more particularly, to a pressure retention closure for a container having a threadless finish.

BACKGROUND

Trends in beverage consumption lean toward the drinking "experience" rather than just traditional consumption. Consumer insights reveal a desire to consume beverages from a drinking glass rather than a traditional bottle. Of particular interest as it relates to containers having more of a drinking glass-type design is the finish portion of the container, and in particular, the need for the finish to have a larger diameter than conventional beverage containers. The finish needs to be functional, in that it must be engageable with a closure, but also not displeasing to the consumer when consuming the beverage packaged in the container.

In traditional beverage packages, the container typically includes a threaded finish and the closure has a complementary threaded portion that is configured to be mated with the finish threads to couple the closure to the container. While the threaded arrangement is certainly well-suited for meeting the functional purpose of engaging the container finish with a closure, the look and feel of a threaded container finish is not particularly pleasing to consumers, especially those seeking a drinking glass-type experience. That is, for a consumer wanting to consume a beverage from a container having a drinking glass-type design, a threaded container finish neither looks like the top portion of a drinking glass, nor feels like a drinking glass when the finish contacts the consumers lips due to the threads on the outer surface of the finish. Accordingly, there is a desire for drinking glass-type containers having a large diameter mouth and a finish that is not threaded, but rather includes other threadless closure-engaging features.

However, in order to provide containers having a threadless finish, a threadless container closure must also be provided. In addition to being suitable for closing and sealing the container, the threadless container closure must also be configured to withstand and retain relatively high internal pressure generated within the container as a result of, for example, one or a combination of carbon dioxide in the beverage (i.e., carbonation), heat to the which the beverage is exposed after the container is closed and sealed by the closure, and agitation to which the beverage is exposed after the container is closed and sealed by the closure.

SUMMARY OF THE DISCLOSURE

The present disclosure embodies a number of aspects that can be implemented separately from or in combination with each other.

A threadless pressure retention closure for a container in accordance with one aspect of the disclosure comprises a pressure closure assembly and an outer release shell configured to be coupled to the pressure closure assembly. The pressure closure assembly comprises a pressure relief valve and an inner shell having an inner shell base wall configured to retain the pressure relief valve, a pressure relief slot for exposing a portion of the pressure relief valve, and an outer skirt extending away from the inner shell base wall and including a first circumferential portion and a second circumferential portion. The outer release shell includes a first portion having a first portion base wall configured to overlap a first corresponding portion of the inner shell base wall when assembled, and a pressure relief tab corresponding to the pressure relief slot of the inner shell. The first portion further includes an outer skirt extending away from the first portion base wall and configured to wrap around the first circumferential portion of the outer skirt of the inner shell of the pressure closure assembly when assembled. The outer release shell further includes a second portion having a second portion base wall configured to overlap a second corresponding portion of the inner shell base wall when assembled, and an outer skirt extending away from the second portion base wall.

In accordance with another aspect of the disclosure, a threadless pressure retention closure for a container comprises a pressure closure assembly and an outer release shell configured to be coupled to the pressure closure assembly. The pressure closure assembly comprises a pressure relief valve and an inner shell having an inner shell base wall configured to retain the pressure relief valve, a pressure relief slot for exposing a portion of the pressure relief valve, and an outer skirt extending away from the inner shell base wall and including a circumferentially interrupted portion and a circumferentially continuous portion. The outer release shell includes a first portion having a first portion base wall configured to rest on top of a corresponding portion of the inner shell base wall when assembled, and a pressure relief tab projecting therefrom corresponding to the pressure relief slot of the inner shell. The first portion further includes an outer skirt extending away from the first portion base wall and configured to wrap around the circumferentially interrupted portion of the outer skirt of the inner shell when assembled. The outer release shell further includes a second portion having a second portion base wall configured to overlap a second corresponding portion of the inner shell base wall when assembled, and an outer skirt extending away from the second portion base wall and being diametrically larger than the outer skirt of the first portion.

In accordance with yet another aspect of the disclosure, a threadless pressure retention closure for a container comprises a pressure closure assembly and an outer release shell configured to be coupled to the pressure closure assembly. The pressure closure assembly includes a pressure relief valve having a central hub and a radially outer disc, and an inner shell having an inner shell base wall with a central valve retention aperture for retaining the central hub of the pressure relief valve of the pressure closure assembly, a semi-circular pressure relief slot extending partially circumferentially around the central valve retention aperture for exposing the radially outer disc of the pressure relief valve, a pressure relief pad at one end of the valve release aperture, and an outer skirt extending away from the inner shell base wall and including a circumferentially interrupted portion and a circumferentially continuous portion. The outer release shell includes a semi-circular major portion having a major base wall configured to rest on top of a corresponding portion of the inner shell base wall when assembled, and a pressure relief tab projecting therefrom corresponding to the semi-circular pressure relief slot of the inner shell and configured to rest on the pressure relief pad when assembled. The major portion further includes an outer skirt extending away from the major base wall and configured to wrap around the circumferentially interrupted portion of the outer skirt of the inner shell when assembled. The outer shell further includes a semi-circular minor portion having a minor base wall stepped axially away from the major base wall and configured to be spaced above a corresponding portion of the inner shell base wall when assembled, and an outer skirt extending away from the minor base wall and diametrically larger than the outer skirt of the major portion.

DETAILED DESCRIPTION

The pressure retention closure described herein is configured to be coupled with a threadless neck finish of a container and to also withstand and retain a relatively high internal pressure generated within the container as a result of, for example, one or a combination of carbon dioxide in the beverage (i.e., carbonation), heat applied to the beverage after the container is closed and sealed by the closure, and agitation of the beverage after the container is closed and sealed by the closure. In an embodiment, the pressure retention closure is a threadless, multi-shell, clamp-on closure that is configured to seal the container to which it is coupled when in a closed position or state, and to vent gas in the container to atmosphere as the closure is rotated from the closed position or state toward an open position or state, while keeping the closure securely attached to the container.

Figure 1:
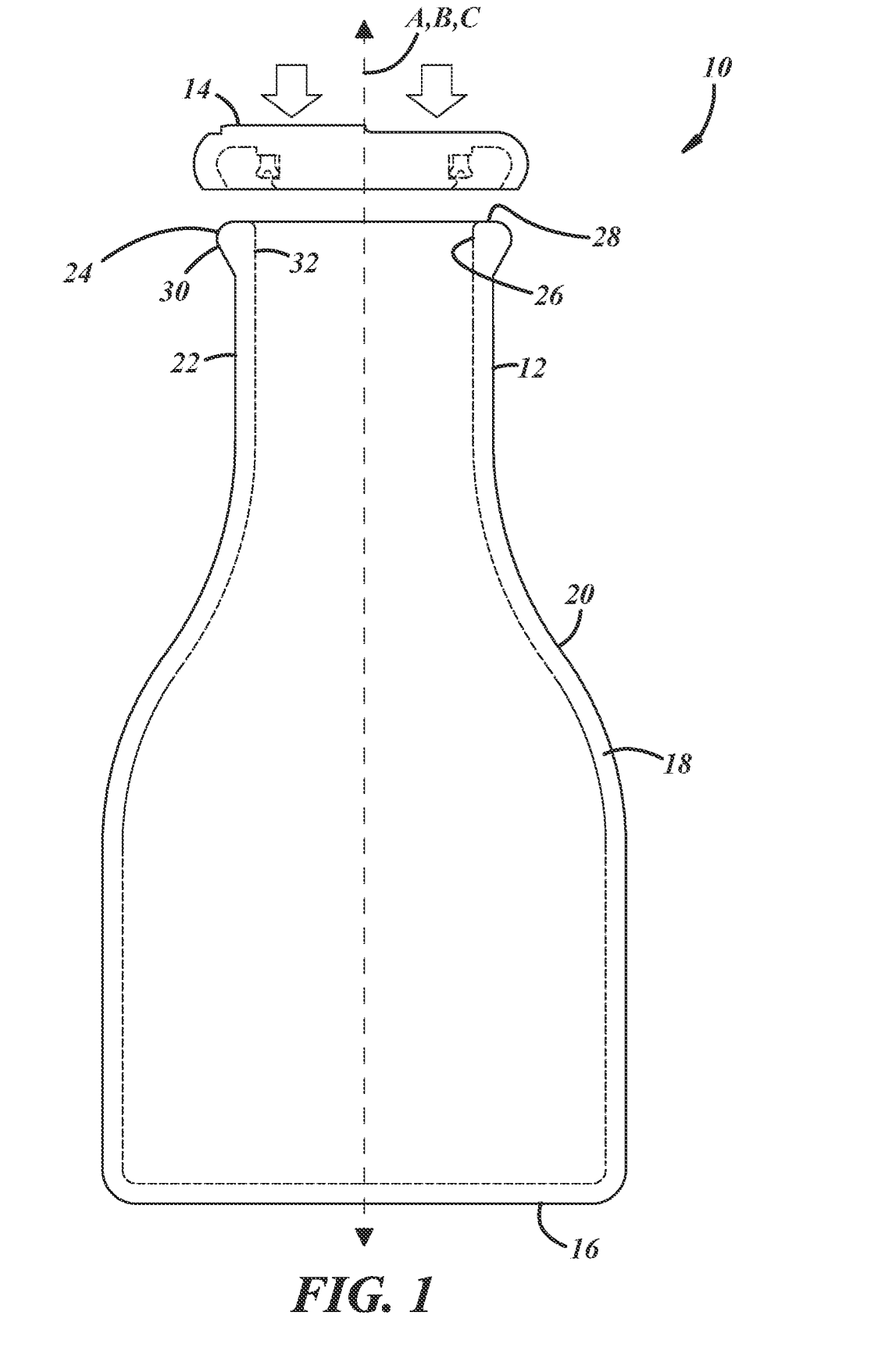
FIG. 1 is a side elevation view of a pressurized package comprising a container and a container closure in accordance with an illustrative embodiment of the present disclosure.

With specific reference to the drawing figures, FIG. 1 shows an illustrative embodiment of a pressurized package 10 that includes, at least in part, a container 12 and a closure 14 configured to be assembled with or coupled to the container 12 to close and seal the container 12. In FIG. 1, the container 12 and closure 14 are shown in a partially assembled state with the downward arrows representing the direction in which the closure is pressed when assembling closure 14 with the container 12.

The container 12 may be used for packaging any number of goods or products. For instance, the container 12 may be used to package various types of beverages, for example and without limitation, carbonated beverages. The container 12 may also be used to package products other than beverages, for example, various types of food products, liquids, gels, powders, and the like. Accordingly, the present disclosure is not intended to be limited to the container 12 being used to package any particular type(s) of goods.

The container 12 may be composed of glass, plastic, or any other material suitable for both packaging the products or goods identified above, as well as withstanding internal pressure generated in the container 12 when the container 12 is filled and sealed by the closure 14. As shown in FIG. 1, the container 12 may include a base 16 and a body 18 extending from the base 16, and further includes or defines a longitudinal axis A. The container 12 may further include a shoulder 20 extending from the body 18, a neck 22 extending from the shoulder 20 or directly from the body 18, and a finish 24 extending from the neck 22 (i.e., a neck finish) or from the body 18. The container 12 may further include an open mouth 26 surrounded by an outer sealing lip or sealing surface 28. The sealing surface 28 is an axially-facing surface that faces away from the container body 18 and that, in an at least one embodiment, is flat such that it extends perpendicular to the axis A of the container 12. In an embodiment, the finish 24 of the container 12 is a threadless finish having a closure attachment feature in the nature of an excavate outer bead 30 that may have a smooth outer surface. The finish 24 may also include an inner sealing surface 32 extending along the longitudinal axis A that, in an embodiment, comprises a cylindrical inner sealing surface. As will be described below, when the container 12 and closure 14 are assembled together, in at least some embodiments, the inner sealing surface 32 is engaged with a seal carried by the closure 14.

As briefly described above, the closure 14 is configured to be assembled with the container 12, and the finish 24 thereof, in particular, to close and seal the container 12. In an embodiment, the closure 14 comprises a pressure retention closure configured to retain and withstand pressure generated within the container 12 when the closure 14 is assembled with the container 12, and that, in at least some embodiments, comprises a threadless, multi-shell, clamp-on closure. In an embodiment, the closure 14 comprises a pressure closure assembly 34 (best shown in FIGS. 2 and 3) and an outer release shell 36 (best shown in FIGS. 4 and 5) configured to be coupled to the pressure closure assembly 34 to form the closure 14.

Figure 2:
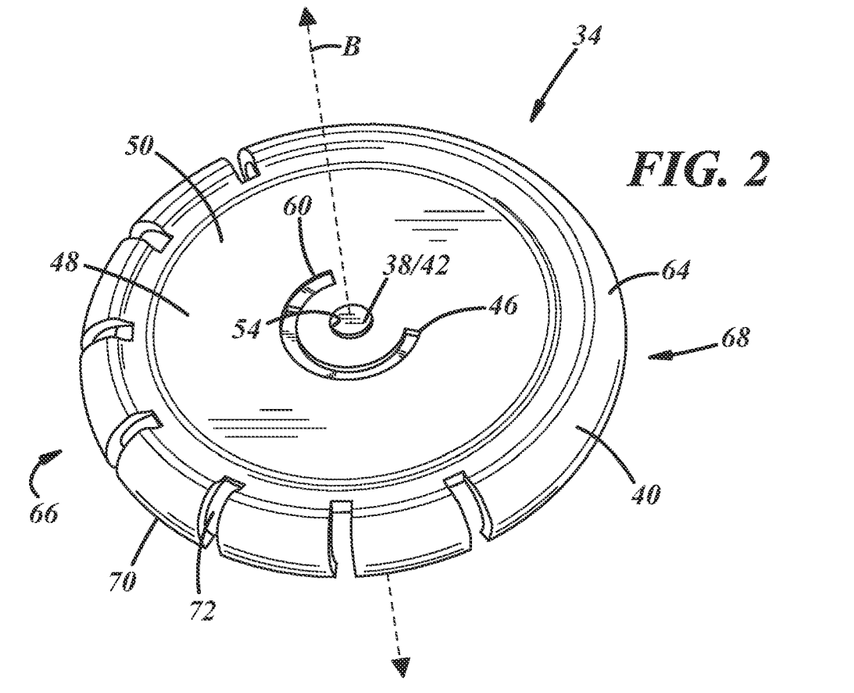
FIGS. 2 and 3 are perspective views of an illustrative embodiment of a pressure closure assembly of the container closure illustrated in FIG. 1.
Figure 3:
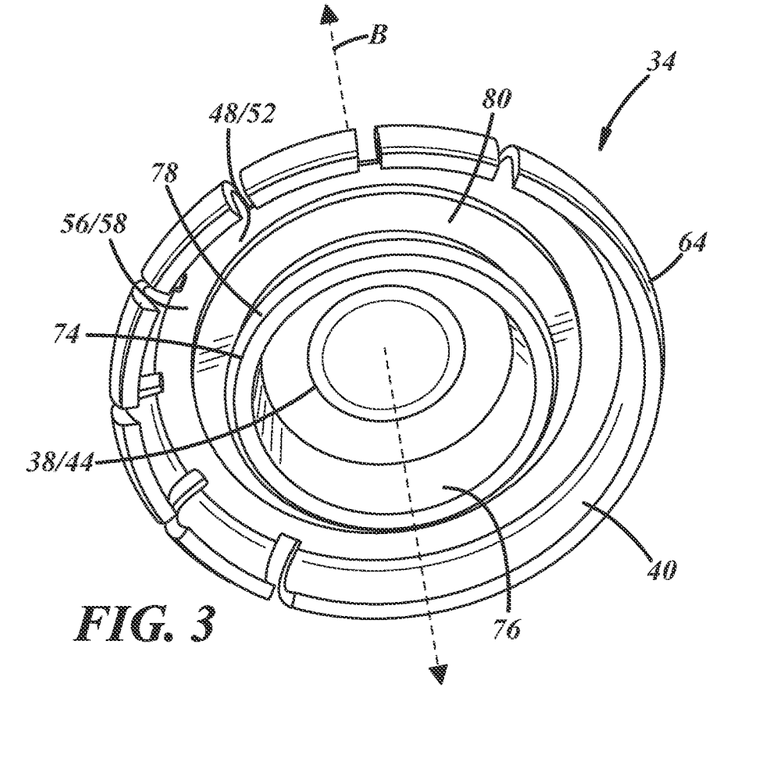

FIGS. 2 and 3 show an illustrative embodiment of the pressure closure assembly 34 of the closure 14. In an embodiment, the pressure closure assembly 34 includes a pressure relief valve 38 and an inner shell 40. In the illustrated embodiment, the pressure relief valve 38 comprises a central hub 42 (best shown in FIG. 2) and a radially outer disc 44 (best shown in FIG. 3). As will be described below, the inner shell 40 is configured to retain the pressure relief valve 38, and, in an embodiment, the central hub 42 thereof, in particular, and the pressure relief valve 38 is configured to cover and seal a pressure relief slot 46 of the inner shell 40 (best shown in FIG. 2).

With continued reference to FIGS. 2 and 3, the inner shell 40 comprises an inner shell base wall 48 having a first or top surface 50 facing in a first direction, a second or bottom surface 52 facing in a second direction opposite the first direction, and a longitudinal axis B extending between and through the top and bottom surfaces 50, 52. In an embodiment, the base wall 48 includes a valve retention aperture 54 extending between and through the top and bottom surfaces 50, 52 of the inner shell base wall 48 that is configured to receive and retain therein a portion of the pressure relief valve 38, for example, the central hub 42. In the illustrated embodiment shown in FIG. 2, the valve retention aperture 54 is located at the center of the base wall 48 (i.e., is coaxial with the axis B), while in other embodiments, the aperture 54 may be located at a different location on the base wall 48. In other embodiments, the relief valve 38 may be coupled with the inner shell 40, and the base wall 48 thereof, in particular (i.e., the bottom surface 52 of the base wall 48), using other known techniques, for example, using an adhesive, a heat staking process, or one or more fasteners, to cite a few examples.

Figure 14:
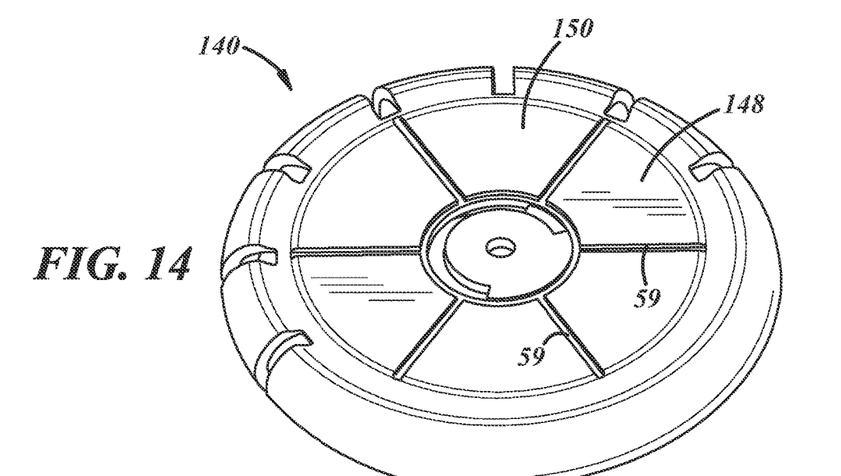
FIG. 14 is a perspective view of an illustrative embodiment of an inner shell of the pressure closure assembly illustrated in, for example, FIGS. 2 and 3.

In at least some embodiments such as that shown in FIG. 3, the inner shell base wall 48 further includes an annular channel 56 and an axially thinned portion 58 at a radially outer periphery of the base wall 48. As will be described in greater detail below, when the inner shell 40 is assembled with the container 12, the annular channel 56 and axially thinned portion 58 of the inner shell base wall 48 rests on and engages the sealing surface 28 of the container 12. Additionally, in some embodiments of the inner shell, such as, for example, that illustrated in FIG. 14 (inner shell 140), the inner shell base wall (base wall 148) may further include one or more features 59 in or on the first or top surface (top surface 150) thereof that help facilitate the venting of gas in the container to atmosphere, as will be described in greater detail below. The features 59 may comprise, for example, one or more grooves recessed into the top surface 150 of the base wall 148, one or more projections extending axially outward from the top surface 150, or a combination of both one or more grooves and one or more projections.

The inner shell 40 further comprises the pressure relief slot 46 briefly described above. The pressure relief slot 46 extends between and through the top and bottom surfaces 50, 52 of the inner shell base wall 48. In an embodiment, the pressure relief slot 46 comprises a semi-circular slot extending partially circumferentially along the base wall 48 and, in an embodiment, at least partially circumferentially around the valve retention aperture 54 in the base wall 48. The pressure relief slot 46 exposes a portion of the relief valve 38, which, as will be described in greater detail below, allows for the manipulation of the valve 38 to vent gas in the container 12 to atmosphere. More specifically, and as shown in FIG. 3, when the relief valve 38 is assembled with the inner shell 40, the disc portion 44 of the valve 38 engages the bottom surface 52 of the base wall 48 and overlies or covers and seals the relief slot 46. The portion of the valve 38 overlying the slot 46 is accessible from the top surface 50 of the inner shell base wall 48.

As shown in FIG. 2, the inner shell 40 may further include a pressure relief pad 60 located adjacent to the pressure relief slot 46 on the top surface 50 of the inner shell base wall 48. The pad 60 is configured to engage a pressure relief tab 62 of the outer release shell 36 when the inner shell 40 and outer release shell 36 are assembled together and oriented in a particular way (i.e., in an orientation corresponding to a closed position or state of the closure 14). In other words, when the inner shell 40 and outer release shell 36 are assembled together and oriented in a particular way, the tab 62 of the outer release shell 36 rests on the pad 60 of the inner shell 40. In an embodiment such as that illustrated in FIG. 2, the pad 60, which may be recessed into the top surface 50 of the inner shell base wall 48, is located at one end of the pressure relief slot 46.

As illustrated in FIGS. 2 and 3, the inner shell 40 further includes an outer skirt 64 extending away from the inner shell base wall 48 in an axially inwardly direction (i.e., in a direction away from the top surface 50 of the base wall 48). In an illustrative embodiment, the outer skirt 64 includes a first circumferential portion 66 extending circumferentially about a first portion of the inner shell base wall 48, and a second circumferential portion 68 extending circumferentially about a second, different portion of the inner shell base wall 48. In at least some embodiments, such as, for example, that shown in FIG. 2, the first circumferential portion 66 of the outer skirt 64 may comprise a circumferentially interrupted portion of the outer skirt 64. As illustrated in FIGS. 2 and 3, the interrupted portion 66 of the outer skirt 64 may include a plurality of petals 70 with spaces 72 therebetween. However, in other embodiments, rather than being circumferentially interrupted, the first portion 66 may instead be circumferentially continuous.

Unlike the first portion 66 of the outer skirt 64 which may be circumferentially interrupted, in the embodiment illustrated in FIGS. 2 and 3 the second portion 68 of the outer skirt 64 may comprise a circumferentially continuous portion of the outer skirt 64. However, in other embodiments, for example, when the first portion 66 of the outer skirt 64 is circumferentially continuous, rather than being circumferentially continuous, the second portion 68 may instead be circumferentially interrupted as described above with respect to first portion 66.

Regardless of whether first or second circumferential portions 66, 68 of the outer skirt 64 are circumferentially continuous or interrupted, the outer skirt 64 is configured to clamp or snap onto the finish 24 of the container 12. More specifically, in an embodiment, the inner diameter of the outer skirt 64 of the inner shell 40 is equal to or less than the outer diameter of the finish 24, and the outer bead 30 thereof, in particular, such that as the inner shell 40 is pressed onto the finish 24 of the container 12, the outer skirt 64 of the inner shell 40 deflects radially outwardly and then snaps back radially inwardly after the outer skirt 64 clears the bead 30. As a result, the first and/or second circumferential portions 66, 68 of the outer skirt 64 wrap around and grip the outer bead 30 to secure the inner shell 40, and thus, the closure 14, to the container finish 24.

In addition to the features described above, in an illustrative embodiment such as that illustrated in FIG. 3, the inner shell 40 includes an inner skirt 74 extending from the inner shell base wall 48 in an axially inwardly direction (i.e., in a direction away from the top surface 50 of the inner shell base wall 48). In an embodiment, the inner skirt 74 is circumferentially continuous and circumscribes the disc portion 44 of the relief valve 38. As shown in FIG. 3, the inner skirt 74 has a radially inwardly-facing inner surface 76 and a radially outwardly-facing outer surface 78. In an embodiment, the inner skirt 74 includes an annular seal channel 80 extending radially inwardly into the outer surface 78 of the inner skirt 74 that is configured to carry an annular seal 82, as is shown in, for example, FIG. 8. In other embodiments, however, the inner skirt 74 may not include the annular seal channel 80 but rather the annular seal 82 may be molded onto, coupled with, or integrated into the skirt 74 using known techniques such that the seal 82 is carried by the skirt 74. In any event, when the inner shell 40 is assembled with the container 12, the annular seal 82 seals against the inner sealing surface 32 of the container finish 24. Accordingly, when the inner shell 40 and the container 12 are assembled together, the finish 24 of the container 12 is located between the inner skirt 74 and the outer skirt 64 of the inner shell 40.

Figure 4:
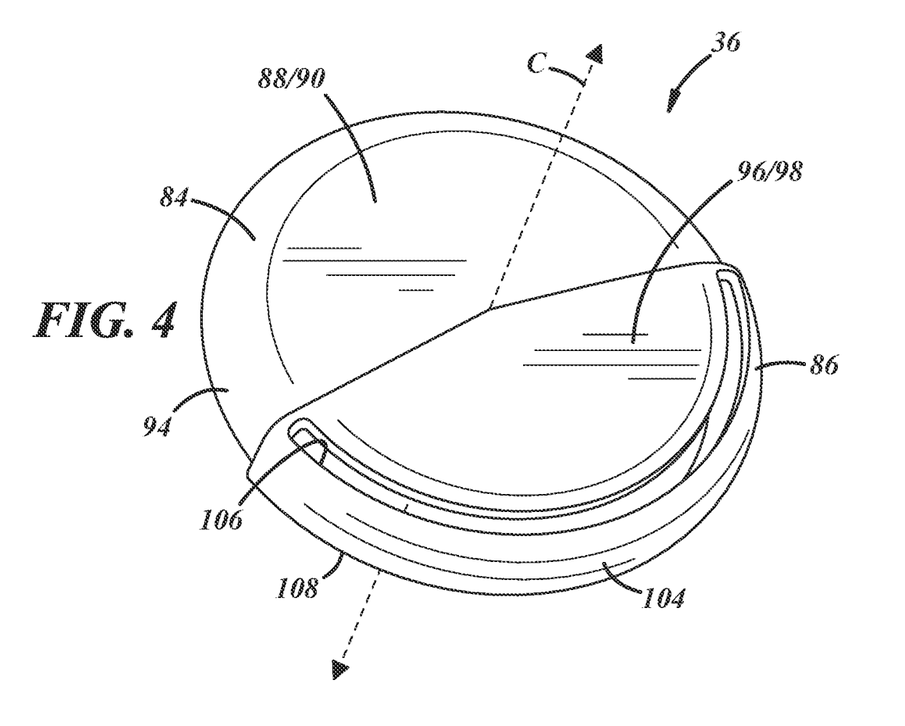
FIGS. 4 and 5 are perspective views of an illustrative embodiment of an outer release shell of the container closure illustrated in FIG. 1.
Figure 5:
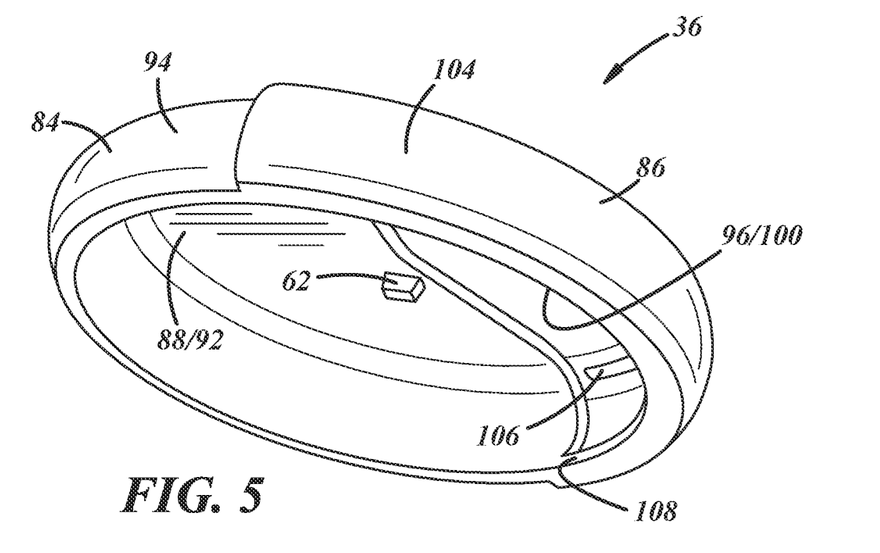

Turning now to FIGS. 4 and 5, an illustrative embodiment of the outer release shell 36 of the closure 14 is shown. As described above, the outer release shell 36 is configured to be coupled to the pressure closure assembly 34. More specifically, the outer release shell 36 is configured to be clamped or snapped onto the inner shell 40 of the pressure closure assembly 34.

In an embodiment, the outer release shell 36 comprises a first portion 84, a second portion 86, and an axis C. In the embodiment illustrated in FIGS. 4 and 5, the first and second portions 84, 86 each comprise a semi-circular portion of the outer release shell, though it will be appreciated that the first and second portions 84, 86 may certainly have other suitable shapes or configurations. Depending on the implementation, one of the first or second portions 84, 86 may be larger than the other, and in such an instance, the larger portion may be considered to be the "major" portion and the smaller portion may be considered to be the "minor" portion. For example, in the embodiment illustrated in FIGS. 4 and 5, the first portion 84 is larger than the second portion 86, and as such, the first portion 84 may be considered to be the major portion of the outer release shell 36, and the second portion 86 may be considered to be the minor portion of the outer release shell 36.

In any event, the first portion 84 includes a first portion base wall 88 configured to overlap, and in some embodiments, rest on, a first corresponding portion of the inner shell base wall 48 when the outer release shell 36 and the inner shell 40 are assembled together. As with the inner shell base wall 48 described above, the first portion base wall 88 includes a first or top surface 90 (best shown in FIG. 4) facing in a first direction and a second or bottom surface 92 (best shown in FIG. 5) facing in a second direction opposite the first direction. In an embodiment wherein the first portion base wall 88 rests on a corresponding portion of the inner shell base wall 48 when the inner shell 40 and outer release shell 36 are assembled together, the bottom surface 92 of the first portion base wall 88 rests on the top surface 50 of the inner shell base wall 48.

While the description above is with respect to an embodiment wherein the first portion base wall 88 rests on a corresponding portion of the inner shell base wall 48 when the outer release shell 36 and inner shell 40 are assembled together, in other embodiments, the first portion base wall 88 does not rest on the inner shell base wall 48 but rather is spaced above the inner shell base wall 48 such that there is a gap or channel therebetween. Accordingly, the present disclosure is not intended to be limited to any particular arrangement(s) of the first portion base wall 88 and inner shell base wall 48.

As briefly described above and illustrated in FIG. 5, the first portion 84 of the outer release shell 36 further includes a pressure relief tab 62. The tab 62 corresponds to the pressure relief slot 46 of the inner shell 40 and, in at least some embodiments, is configured to rest on the pressure relief pad 60 of the inner shell 40 when the outer release shell 36 and inner shell 40 are assembled together. The pressure relief tab 62 projects and extends from the bottom surface 92 of the first portion base wall 88 in an axially inwardly direction (i.e., in a direction away from the top surface 90 of the first portion base wall 88).

As will be described in greater detail below, when the inner shell 40 and outer release shell 36 are assembled together, the outer release shell 36 is rotatable or configured for rotation relative to the inner shell 40. When the outer release shell 36 is rotated from a first or closed position or state towards a second or open position or state, the tab 62 moves off of the pressure relief pad 60 on which it rests when the outer release shell 36 is in the first or closed position (in an embodiment wherein the inner shell 40 includes the relief pad 60), and drops into the pressure relief slot 46 of the inner shell 40. Upon dropping into the slot 46, the tab 62 engages a portion of the relief valve 38 (e.g., the disc portion 44) and displaces or pushes it away from the bottom surface 52 of the inner shell base wall 48. The displacement of the valve 38 creates a gap between the relief valve 38 and the inner shell base wall 48 through which gas in the container 12 may escape to atmosphere. More specifically, gas may escape from between the pressure relief valve 38 and the inner shell 48 and, as will be described below, between the inner shell 40 and the outer release shell 36.

While in the embodiment described above the pressure relief tab 62 extends from the base wall 88 of the release shell first portion 84, in other embodiments, the pressure relief tab 62 may instead extend from the second portion 86 of the outer release shell 36, but may otherwise be configured and operative as described above. Accordingly, the present disclosure is not intended to be limited to any particular arrangement or orientation of the pressure relief tab 62.

Figure 6:
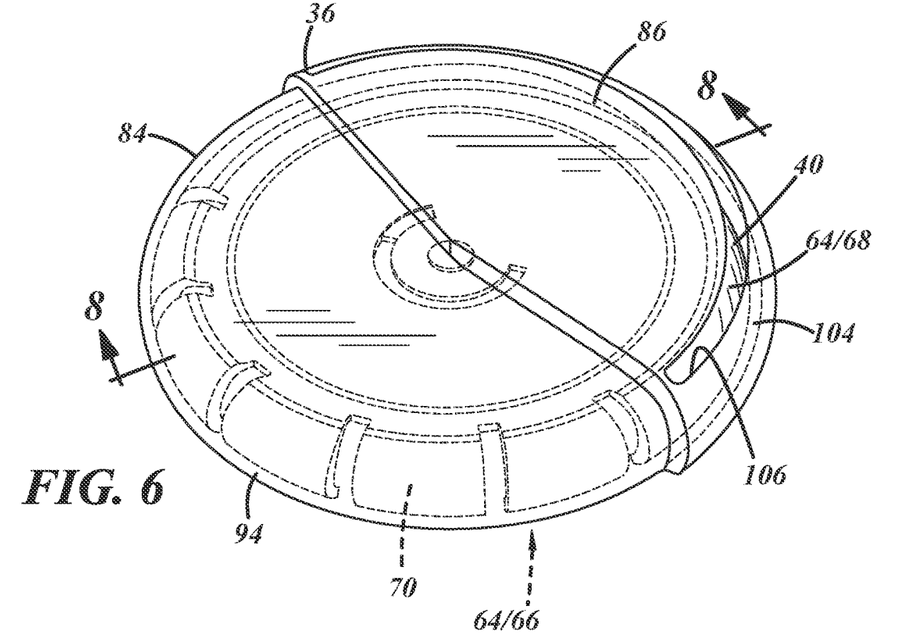
FIGS. 6 and 7 are perspective views of an illustrative embodiment of the container closure illustrated in FIG. 1 comprising the pressure closure assembly illustrated in FIGS. 2 and 3 and the outer release shell illustrated in FIGS. 4 and 5.
Figure 7:
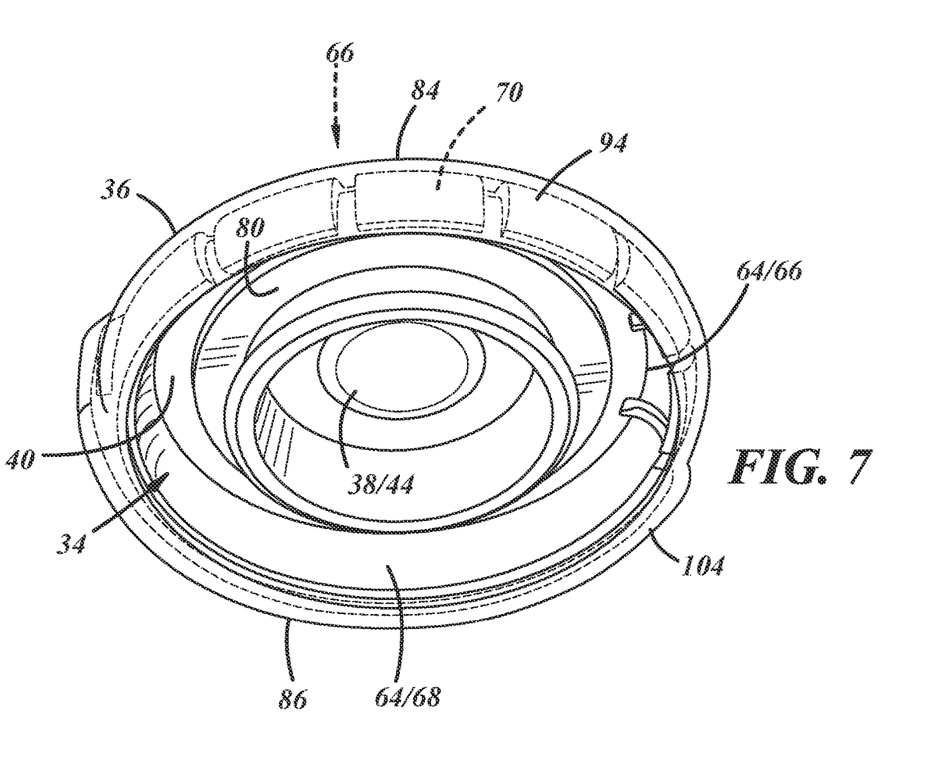

In addition to the features described above, the first portion 84 of the outer release shell 36 further includes an outer skirt 94. The outer skirt 94 extends from the first portion base wall 88 in an axially inwardly direction (i.e., in a direction away from the top surface 90 of the first portion base wall 88). As shown in FIGS. 6 and 7, the outer skirt 94 is configured to engage with and wrap around at least a portion of the outer skirt 64 of the inner shell 40, for example, the first circumferential (e.g., circumferentially interrupted) portion 66 of the inner shell outer skirt 64. More specifically, the outer skirt 94 of the first portion 66 of the outer release shell 40 is configured to clamp or snap onto the outer skirt 64 of the inner shell 40 to couple the outer release shell 36 and inner shell 40 together. While the outer release shell 36 and inner shell 40 are coupled together, the outer release 36 is nevertheless configured for rotation relative to the inner shell 40.

The second portion 86 of the outer release shell 36 includes a second portion base wall 96 that is configured to overlap a second corresponding portion of the inner shell base wall 48 when the outer release shell 36 and the inner shell 40 are assembled together. The second portion base wall 96 includes a first or top surface 98 facing in a first direction and a second or bottom surface 100 facing in a second direction opposite the first direction.

Figure 8:
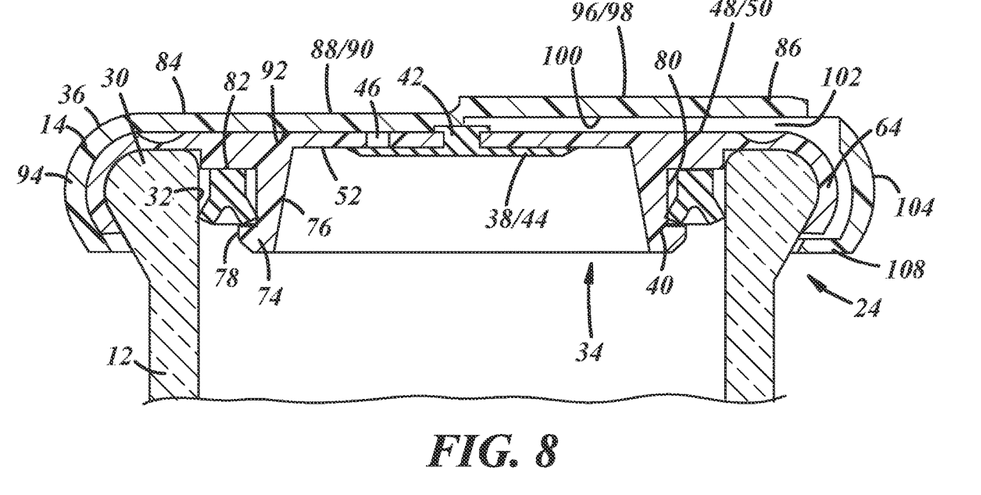
FIG. 8 is a cross-sectional view of a portion the pressurized package illustrated in FIG. 1 taken along the line 8-8 in FIG. 6, wherein the container closure is in a closed position or state.

In an embodiment such as that shown in FIGS. 5 and 8, the second portion base wall 96 is configured to be spaced above a corresponding portion of the inner shell base wall 48 when the inner shell 40 and outer release shell 36 are assembled together. In such an embodiment, the top and bottom surfaces 98, 100 of the second portion base wall 96 are stepped axially away from the top and bottom surfaces 90, 92 of the first portion base wall 88, respectively. Further, as best shown in FIG. 8, when the outer release shell 36 and inner shell 40 are assembled together, because the second portion base wall 96 is spaced about the inner shell base wall 48, a channel or pathway 102 is formed between the bottom surface 100 of the second portion base wall 96 and the top surface 50 of the inner shell base wall 48 through which gases may flow when the outer release shell 36 is rotated relative to the inner shell 40.

Figure 13:
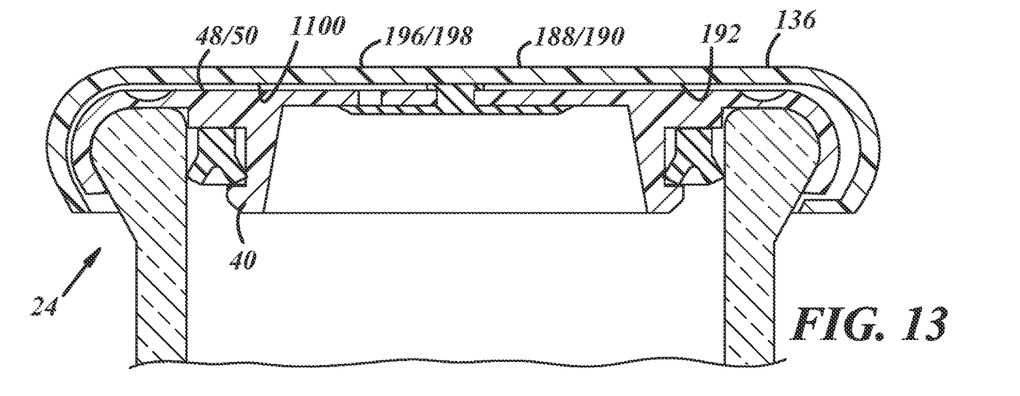
FIG. 13 is a cross-sectional view of a portion of another illustrative embodiment of a pressurized package wherein the container closure is in a closed position or state.

While the description above is with respect to an embodiment wherein the second portion base wall 96 is spaced above a corresponding portion of the inner shell base wall 48 when the outer release shell 36 and inner shell 40 are assembled together, in other embodiments, the second portion base wall 96 is not spaced above the inner shell base wall 48, but rather rests on the inner shell base wall 48. For example, in the embodiment of the outer shell illustrated in FIG. 13 (outer shell 136), the top and bottom surfaces (surfaces 198, 1100) of the second portion base wall (base wall 196) are coplanar with the top and bottom surfaces (surfaces 190, 192) of the first portion base wall (base wall 188), respectively. Accordingly, when the inner shell 40 and outer release shell 136 are assembled together, the bottom surface 1100 of the second portion base wall 196 rests on the top surface 50 of the inner shell base wall 48. Accordingly, the present disclosure is not intended to be limited to any particular arrangement(s) of the second portion base wall 96 and inner shell base wall 48.

In addition to the base wall 96, the second portion 86 of the outer release shell 36 may further include an outer skirt 104. The outer skirt 104 extends from the second portion base wall 96 in an axially inwardly direction (i.e., in a direction away from the top surface 98 of the second portion base wall 96). As shown in FIGS. 6 and 7, the outer skirt 104 is configured to overlap and wrap around at least a portion of the outer skirt 64 of the inner shell 40, for example, the second circumferential (e.g., circumferentially continuous) portion 68 of the inner shell outer skirt 64. More specifically, the outer skirt 104 of the second portion 86 of the outer release shell 36 is configured to clamp or snap onto the outer skirt 64 of the inner shell 40 to couple the outer release shell 36 and inner shell 40 together. While the outer release shell 36 and inner shell 40 are coupled together, the outer release 36 is nevertheless configured for rotation relative to the inner shell 40.

Figure 15:
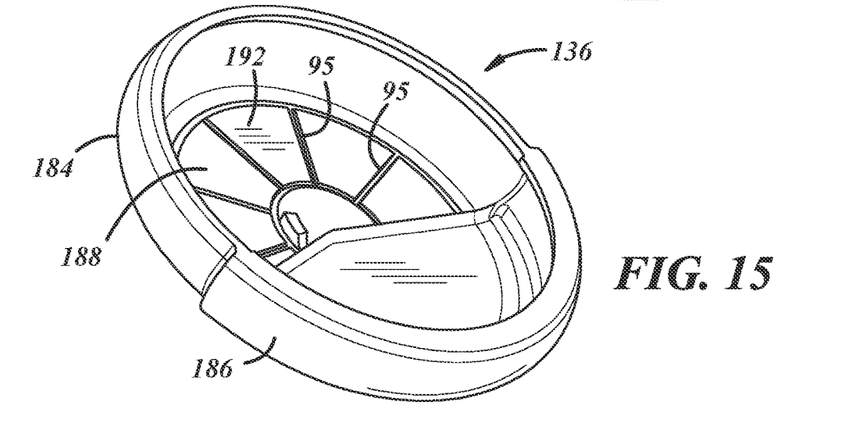
FIG. 15 is a perspective view of another illustrative embodiment of an outer release shell of the container closure illustrated in FIG. 1.

In addition to the above, in at least some embodiments, one or more of the bottom surface of the base wall of the first portion of the outer release shell and the bottom surface of the base wall of the second portion of the outer release shell may include one or more features therein that help facilitate the venting of gas in the container to atmosphere. For example, in the embodiment of the outer release shell illustrated in FIG. 15 (outer release shell 136), the base wall (base wall 188) of the first portion (184) may further include one or more features 95 in the second or bottom surface (surface 192) thereof that help facilitate the venting of gas in the container to atmosphere. The features 95 may comprise, for example, one or more grooves recessed into the bottom surface 192 of the base wall 188, one or more projections extending axially outward from the bottom surface 192, or a combination of both one or more grooves and one or more projections. While FIG. 15 shows and the description above is with respect to the first portion 184 of the outer release shell 136 having one or more features 95 in the base wall bottom surface 192, it will be appreciated that in other embodiments, in addition to or instead of the base wall bottom surface 192 having one or more features 95 therein, the bottom surface (bottom surface 1100) of the base wall (196) of the second portion (second portion 186) may include one or more features therein (not shown) to facilitate the venting of gas to atmosphere.

As shown in FIG. 4, the outer release shell 36 may further include one or more throughgoing slots 106 at a radially outer periphery of the second portion base wall 96. In an embodiment, the slot 106 comprises a semi-circular slot that extends circumferentially along a part or the entirety of the second portion 86 of the outer release shell 36. One purpose of the slot 106 is to allow for the molding of a lift ledge 108 of the outer release shell 36, which will be described below. Additionally, however, the slot 106 may provide a pathway through which gas in the container is vented to atmosphere when at least a portion of the relief valve 38 of the pressure closure assembly 34 is displaced. While in the embodiment described above and shown in FIG. 4 only the second portion 86 of the outer release shell 36 includes the slot 106, in other embodiments, the first portion 84 of the outer release shell 36 may additionally or alternatively include such a slot, or the outer release shell 36 may include a circumferentially continuous slot that extends about the entire circumference of the outer release shell 36. Accordingly, the present disclosure is not intended to be limited to any particular arrangement or orientation of a throughgoing slot in the outer release shell 36.

As described above, both the first and second portions 84, 86 of the outer release shell 36 have outer skirts—first portion 84 includes the outer skirt 94, and the second portion 86 includes the outer skirt 104. In at least one embodiment, the outer skirts 94, 104 have different inner and/or outer diameters. For example, in the embodiment illustrated in FIGS. 4 and 5, the inner and outer diameters of the of the skirt 104 are larger than the inner and outer diameters of the outer skirt 94. In another embodiment, however, the inner and outer diameters of the outer skirt 94 may be larger than the inner and outer diameters of the outer skirt 104.

In an embodiment wherein the outer skirt of one of the first and second portions 84, 86 of the outer release shell 36 has at least an inner diameter that is larger than that of the other of the first and second portions 84, 86, the portion of the outer release shell 36 having a larger diameter may also include a radially inwardly extending lift ledge 108 (best shown in FIG. 8) at the end of the outer skirt opposite the base wall of the outer release shell 36. For example, in the embodiment illustrated in FIG. 8 wherein the second portion 86 of the outer release shell 36 is diametrically larger than the first portion 84, the second portion 86 includes the lift ledge 108 at the end of the outer skirt 104 opposite the base wall 96 of the second portion 86. As will described in greater detail below, in an embodiment wherein the first portion 66 of the inner shell 40 is circumferentially interrupted as shown in FIGS. 2 and 3, the combination of the larger diameter of the outer skirt 104 and the lift ledge 108 at the end of the outer skirt 104 allows for the release of the petals or segments 70 of the interrupted portion 66 of the inner shell 40 from the container finish 24, thereby allowing for the closure 14 to be removed from the container 12.

With reference to FIGS. 6-12, the assembly of the the pressure closure assembly 34 with the outer release shell 36, the coupling of the closure 14 to the container 12, and the operation of closure 14 after it has been coupled with the container 12 will now be described.

Figure 9:
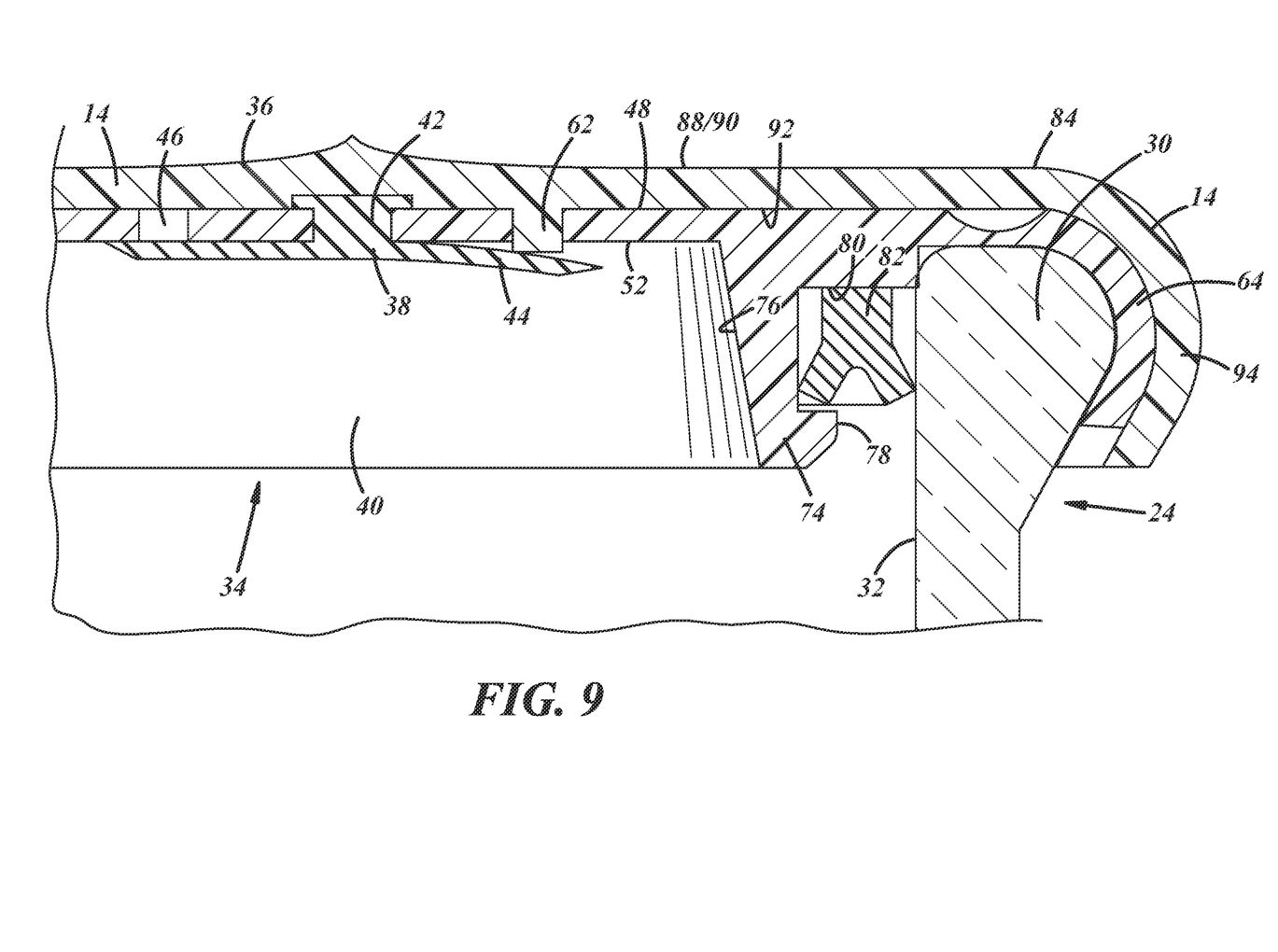
FIG. 9 is another cross-sectional view of a portion of the pressurized package illustrated in FIG. 1, wherein the container closure is between the closed position or state and an open position or state.

As shown in one or more of FIGS. 6-9, the inner shell 40 of the pressure closure assembly 34 is configured to be clamped or snapped onto the finish 24 of the container 12, and the outer release shell 36 is configured to be clamped or snapped onto the inner shell 40. As best shown in FIGS. 8 and 9, when the inner shell 40 is assembled with the container 12, the annular seal 82 of the inner skirt 74 of the inner shell 40 seals against the inner sealing surface 32 of the container finish 24, and the outer skirt 64 of the inner shell 40 wraps around the outer bead 30 of the container finish 24.

Figure 10:
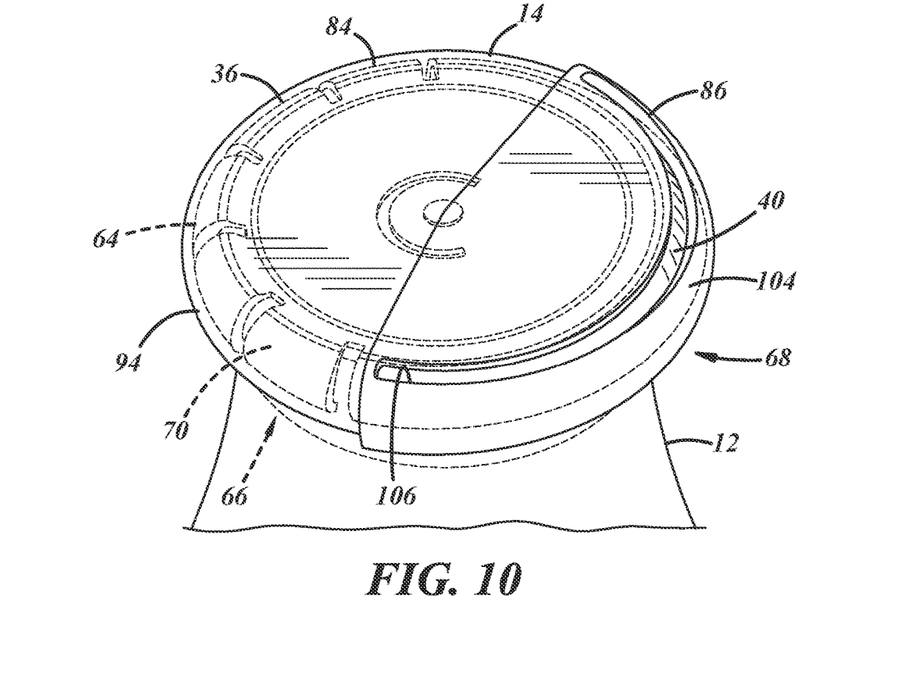
FIG. 10 is a perspective view of a portion of the pressurized package illustrated in FIG. 1, wherein the container closure is in a closed position or state.

As described elsewhere above, when the outer release shell 36 and the inner shell 40 are coupled or assembled together (i.e., the outer release shell 36 is snapped onto the inner shell 40), the outer release shell 36 is rotatable relative to the inner shell 40. More specifically, the outer release shell 36 is rotatable from a first or closed position or state in which the closure 14 seals the container, and thus, retains the pressure in the container 12, to a second or open position or state in which the closure 14 vents gas in the container 12 to atmosphere. As shown in FIG. 10, when the closure 14, and the outer release shell 36 thereof, in particular, is in the closed state or position, the outer release shell 36 is circumferentially oriented with respect to the inner shell 40 so that the outer skirt 94 of the first portion 84 (e.g., major portion) of the outer release shell 36 grips the corresponding circumferential first portion 66 (e.g., interrupted portion) of the outer skirt 64 of the inner shell 40. When oriented in this way, and in an embodiment wherein the inner shell 40 includes the relief pad 60, the pressure relief tab 62 (not shown in FIG. 10) of the first portion 84 of the outer release shell 36 rests on the pressure relief pad 60 (not shown in FIG. 10).

Figure 11:
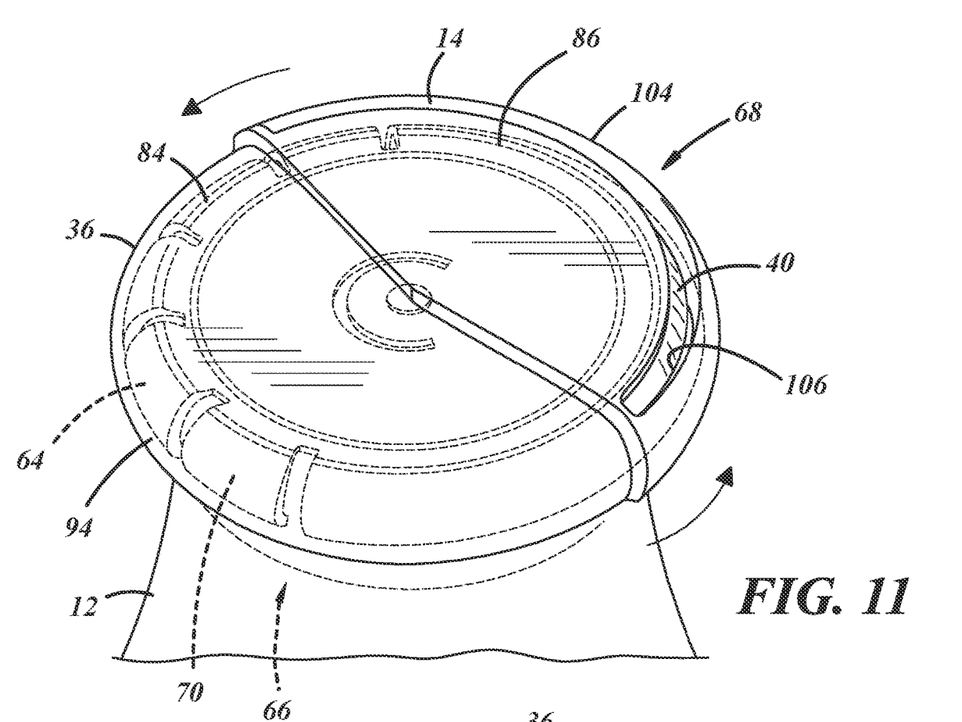
FIG. 11 is a perspective view of a portion of the pressurized package illustrated in FIG. 1, wherein the container closure is between the closed position or state and an open position or state.

As the outer release shell 36 is rotated relative to the inner shell in, for example, a counterclockwise direction as shown in FIG. 11, toward the second or open position, the tab 62 is moved off of the pressure relief pad 60 (if applicable) and drops into the pressure relief slot 46 in the base wall 48 of the inner shell 40. Upon dropping into the slot 46, the tab 62 engages a portion of the relief valve 38 (e.g., the disc portion 44) and, as shown in FIG. 9, displaces or pushes the relief valve 38 away from the bottom surface 52 of the inner shell base wall 48. As a result, a gap is formed between the relief valve 38 and the inner shell base wall 48 through which gas in the container may escape to atmosphere (i.e., gas may escape from between the pressure relief valve 38 and the inner shell 40, and from between the inner shell 40 and the outer release shell 36). More specifically, gas in the container 12 passes between the relief valve and the inner surface base wall 48, through the relief slot 46 and out to atmosphere through spaces or gaps between the inner shell 40 and outer release shell 36. In an embodiment, wherein the channel or pathway 102 is formed between the bottom surface 100 of the second portion base wall 96 of the outer release shell 36 and the top surface 50 of the inner shell base wall 48, the gas may pass out to atmosphere through the slot 106.

Figure 12:
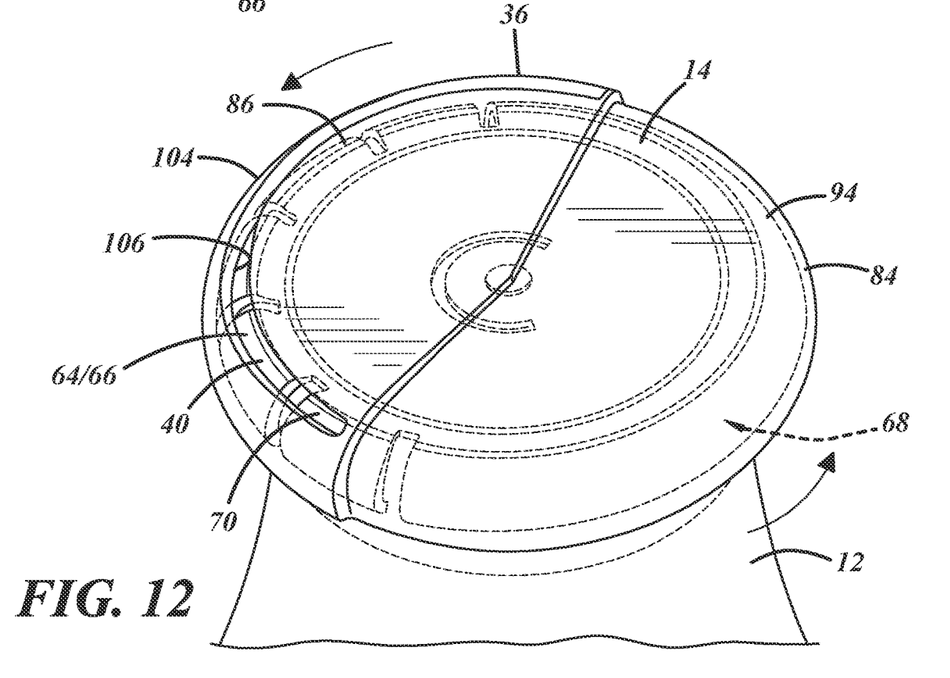
FIG. 12 is a perspective view of a portion of the pressurized package illustrated in FIG. 1, wherein the container closure is in the open position or state.

As the outer release shell 36 continues to rotate towards the open position or state, the tab 62 travels within the relief slot 46 and continues to displace the relief valve 38 as it moves to allow for continued venting of the container 12. When the tab 62 reaches the end of the relief slot 46 such that the outer release shell 36 cannot rotate any further, the inner shell 40 and outer release shell 36 are oriented as shown in FIG. 12 such that the outer skirt 104 of the second portion 86 (i.e., minor portion) of the outer release shell 36 substantially circumferentially overlaps the first circumferential portion 66 (e.g., the interrupted portion) of the outer skirt 64 of the inner shell 40. It will be appreciated that for purposes of this disclosure, the term "substantially" is intended to mean that the outer skirt 104 of the second portion 86 of the outer release shell 36 overlaps the entirety of the first circumferential portion 66 of the inner shell outer skirt 64, or overlaps at least a majority of the first circumferential portion 66 of the inner shell outer skirt 64.

In any event, when the outer skirt 104 of second portion 86 of the outer release shell 36 is oriented in this manner and the second portion 86 of the outer release shell 36 includes the lift ledge 108 at the end of the outer skirt 104, the lift ledge 108 is liftable to engage and lift up on an edge of the outer skirt 64 of the inner shell 40 to remove the closure 14 from the container 12. In an embodiment wherein the second portion 86 of the outer release shell 36 includes a larger diameter than the first portion, the larger diameter results in a gap between the outer release shell 36 and the skirt 64 and allows the edge of the outer skirt 64 of the inner shell 40 being lifted to be pulled further away from the outer bead 30 of the container 12 than if it had a smaller diameter, thereby facilitating the removal of the closure 14 from the container 12 and making the removal easier.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A threadless pressure retention closure for a container, comprising:
   a pressure closure assembly including
      a pressure relief valve, and
      an inner shell having an inner shell base wall configured to retain the pressure relief valve, a pressure relief slot for exposing a portion of the pressure relief valve, and an outer skirt extending away from the inner shell base wall and including a first circumferential portion and a second circumferential portion; and
   an outer release shell configured to be coupled to the pressure closure assembly, and including
      a first portion having a first portion base wall configured to overlap a first corresponding portion of the inner shell base wall when assembled, and a pressure relief tab corresponding to the pressure relief slot of the inner shell, the first portion further having an outer skirt extending away from the first portion base wall and configured to wrap around the first circumferential portion of the outer skirt of the inner shell of the pressure closure assembly when assembled, and
      a second portion having a second portion base wall configured to overlap a second corresponding portion of the inner shell base wall when assembled, and an outer skirt extending away from the second portion base wall.

2. The closure of claim 1, wherein the first circumferential portion of the outer skirt of the inner shell comprises a circumferentially interrupted portion of the outer skirt, and the second circumferential portion of the outer skirt of the inner shell comprises a circumferentially continuous portion of the outer skirt.

3. The closure of claim 1, wherein the inner shell further includes an inner skirt extending axially inwardly from the inner shell base wall and carrying an annular seal.

4. A pressurized package, comprising:
a container including a neck finish having an inner sealing surface extending along a longitudinal axis, an outer sealing axially-facing surface extending perpendicular to the axis, and an outer bead; and
the closure of claim 1 coupled to the container, wherein the inner shell is coupled to the container neck finish such that the inner shell outer skirt wraps around the outer bead of the container neck finish.

5. The package of claim 4, wherein when assembled with the pressure closure assembly on the container, the release shell is circumferentially oriented with respect to the inner shell so that the outer skirt of the first portion of the release shell grips the corresponding circumferential first portion of the outer skirt of the inner shell.

6. The package of claim 5, wherein the release shell is rotatable relative to the inner shell so that the pressure relief tab drops into the pressure relief slot to displace a portion of the relief valve so that gas escapes to atmosphere from between the pressure relief valve and the inner shell and between the inner shell and the release shell.

7. The package of claim 6, wherein the outer skirt of the second portion of the release shell includes a radially inwardly extending lift ledge at an end of the outer skirt opposite the second portion base wall, and further wherein the release shell is further rotatable relative to the inner shell until the outer skirt of the second portion of the release shell substantially circumferentially overlaps the first circumferential portion of the outer skirt of the inner shell, wherein the lift ledge of the release shell is liftable to engage and lift up on an edge of the outer skirt of the inner shell to remove the closure from the container.

8. The closure of claim 1, wherein the outer skirt of the second portion of the release shell is diametrically larger than the outer skirt of the first portion.

9. A threadless pressure retention closure for a container, comprising:
a pressure closure assembly including
a pressure relief valve, and
an inner shell having an inner shell base wall configured to retain the pressure relief valve, a pressure relief slot for exposing a portion of the pressure relief valve, and an outer skirt extending away from the inner shell base wall and including a circumferentially interrupted portion and a circumferentially continuous portion; and
an outer release shell configured to be coupled to the pressure closure assembly, and including
a first portion having a first portion base wall configured to rest on top of a corresponding portion of the inner shell base wall when assembled, and a pressure relief tab projecting therefrom corresponding to the pressure relief slot of the inner shell, the first portion further having an outer skirt extending away from the first portion base wall and configured to wrap around the circumferentially interrupted portion of the outer skirt of the inner shell when assembled, and
a second portion having a second base wall configured to overlap a second corresponding portion of the inner shell base wall when assembled, and an outer skirt extending away from the second portion base wall and being diametrically larger than the outer skirt of the first portion.

10. The closure of claim 9, wherein the minor portion further includes a semi-circular slot at a radially outer periphery of the second portion base wall.

11. The closure of claim 9, wherein the outer skirt of the minor portion of the release shell includes a radially inwardly extending lift ledge at an end of the outer skirt opposite the second portion base wall.

12. The closure of claim 9, wherein the inner shell further includes an inner skirt extending axially inwardly from the inner shell base wall and carrying an annular seal.

13. The closure of claim 9, wherein the inner shell base wall also includes an annular channel and a corresponding axially thinned portion at a radially outer periphery of the base wall.

14. A pressurized package comprising:
a container including a neck finish having a cylindrical inner sealing surface extending along a longitudinal axis, a flat axially outer sealing surface extending perpendicular to the axis, and a smoothly excavate outer bead; and
the closure of claim 9 coupled to the container, wherein the inner shell is coupled to the container neck finish such that the inner shell outer skirt wraps around the outer bead of the container neck finish.

15. The package of claim 14, wherein the closure further includes an inner skirt extending axially inwardly from the inner shell base wall and carrying an annular seal, and further wherein the annular seal seals against the cylindrical inner sealing surface of the container neck finish.

16. The package of claim 14, wherein when assembled with the pressure closure assembly on the container, the release shell is circumferentially oriented with respect to the inner shell so that the outer skirt of the first portion of the release shell grips the corresponding circumferentially interrupted portion of the outer skirt of the inner shell.

17. The package of claim 16, wherein the release shell is rotatable relative to the inner shell so that the pressure relief tab drops into the pressure relief slot to displace the relief valve so that gas escapes to atmosphere from between the pressure relief valve and the inner shell and between the inner shell and the release shell.

18. The package of claim 17, wherein outer skirt of the second portion of the release shell includes a radially inwardly extending lift ledge at an end of the outer skirt opposite the second portion base wall, and further wherein the release shell is further rotatable relative to the inner shell until the outer skirt of the second portion of the release shell substantially circumferentially overlaps the circumferentially interrupted portion of the outer skirt of the inner shell, wherein the lift ledge of the release shell is liftable to engage and lift up on an edge of the outer skirt of the inner shell to remove the closure from the container.

19. A threadless pressure retention closure for a container, comprising:
a pressure closure assembly including
a pressure relief valve having a central hub and a radially outer disc, and
an inner shell having an inner shell base wall with a central valve retention aperture for retaining the central hub of the pressure relief valve of the pressure closure assembly, a semi-circular pressure relief slot extending partially circumferentially around the central valve retention aperture for exposing the radially outer disc of the pressure relief valve, a pressure relief pad at one end of the valve release aperture, and an outer skirt extending away from the inner shell base wall and including a circumferentially interrupted portion and a circumferentially continuous portion; and an outer release shell configured to be coupled to the pressure closure assembly, and including
- a semi-circular major portion having a major base wall configured to rest on top of a corresponding portion of the inner shell base wall when assembled, and a pressure relief tab projecting therefrom corresponding to the semi-circular pressure relief slot of the inner shell and configured to rest on the pressure relief pad when assembled, the major portion further having an outer skirt extending away from the major base wall and configured to wrap around the circumferentially interrupted portion of the outer skirt of the inner shell when assembled, and
- a semi-circular minor portion having a minor base wall stepped axially away from the major base wall and configured to be spaced above a corresponding portion of the inner shell base wall when assembled, and an outer skirt extending away from the minor base wall and diametrically larger than the outer skirt of the major portion.

20. The closure of claim 19, wherein the outer skirt of the minor portion of the release shell includes a radially inwardly extending lift ledge at an end of the outer skirt opposite the minor base wall.

\* \* \* \* \*